United States Patent [19]
Yuki et al.

[11] Patent Number: 5,374,941
[45] Date of Patent: Dec. 20, 1994

[54] DISPLAY CONTROL APPARATUS FOR DISPERSIONLESS DISPLAY

[75] Inventors: Osamu Yuki, Atsugi; Katsuhiro Miyamoto, Isehara, both of Japan

[73] Assignee: Canon Kabushiki Kaisha, Tokyo, Japan

[21] Appl. No.: 945,400

[22] Filed: Sep. 16, 1992

[30] Foreign Application Priority Data

Sep. 18, 1991 [JP] Japan ................................ 3-265443

[51] Int. Cl.⁵ ............................................. G09G 3/36
[52] U.S. Cl. ......................................... 345/97; 345/98
[58] Field of Search ..................... 345/87, 98, 99, 100, 345/97; 358/136, 230, 236; 348/440, 412, 415

[56] References Cited

U.S. PATENT DOCUMENTS 3,553,362  1/1971  Mounts .................. 358/136
4,655,561  4/1987  Kanbe et al. .

FOREIGN PATENT DOCUMENTS 0411464  2/1991  European Pat. Off. .

Primary Examiner—Jeffery Brier
Attorney, Agent, or Firm—Fitzpatrick, Cella, Harper & Scinto

[57] ABSTRACT

A display control apparatus includes a frame memory for storing first frame video data on CRT image signals at least for one frame portion, a storage device for comparing the first frame video data with displaying pixel data at the same image position in video data for a subsequent frame to identify changes in the display contents on a per pixel basis and for storing address information of the changed pixels on a per pixel or per scanning line basis. Also included is a transfer device for reading displaying pixel data from the frame memory on a per pixel or per scanning line basis, based on the address information, and for transferring the data to a display driving unit of the liquid crystal display device. With this display control apparatus, a highly precise flickerless image display is implemented without any dispersion.

12 Claims, 7 Drawing Sheets

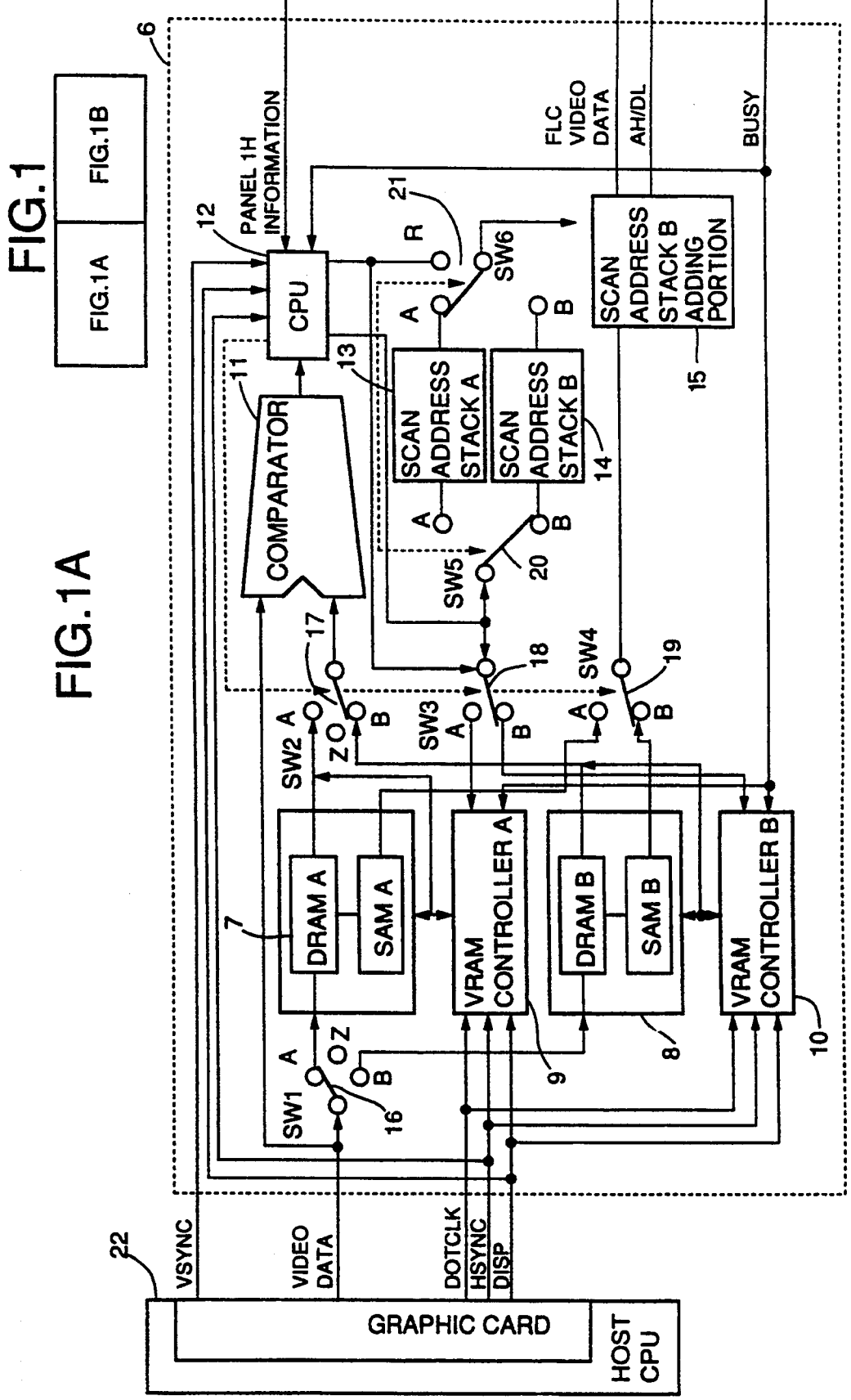

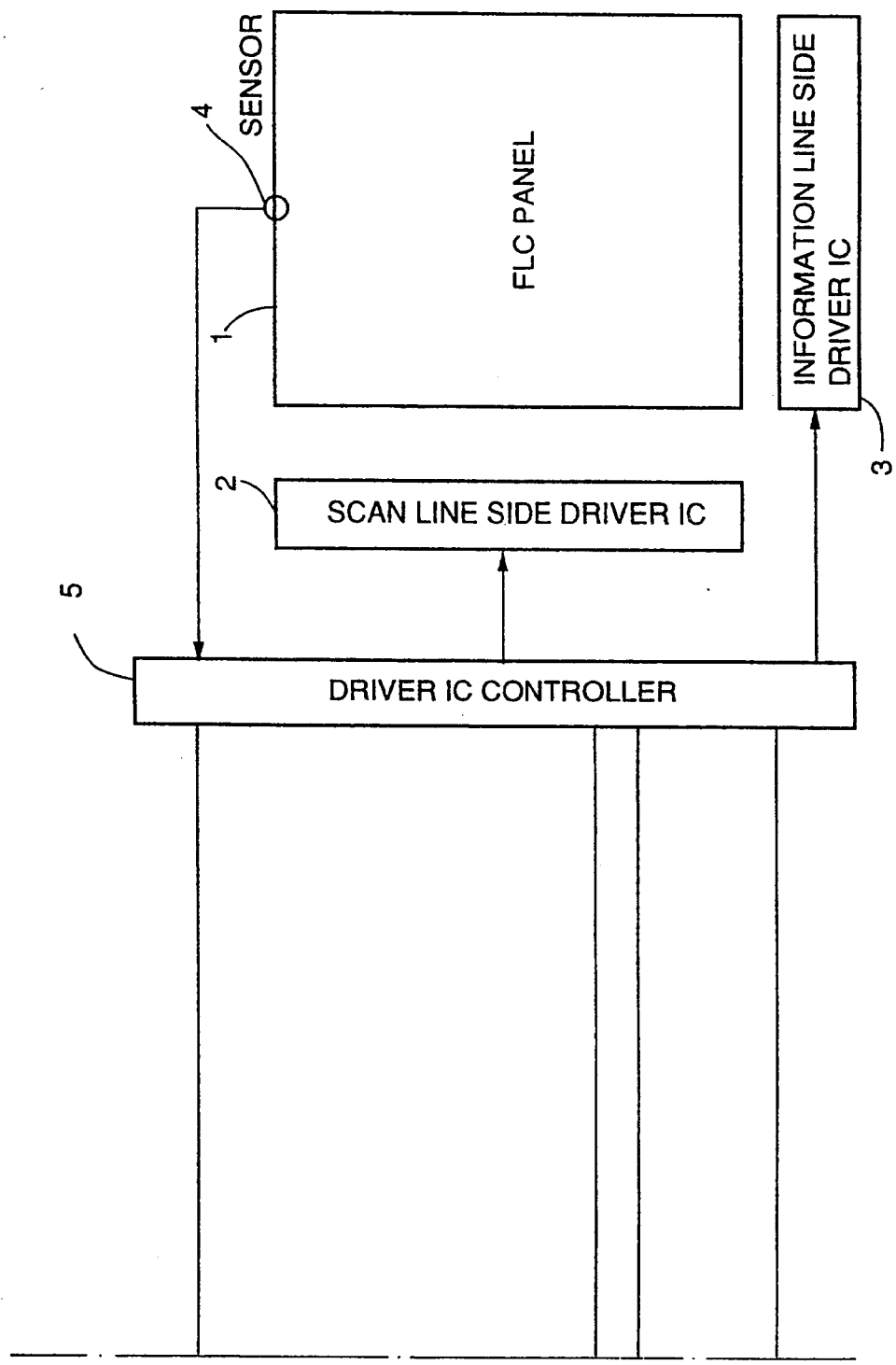

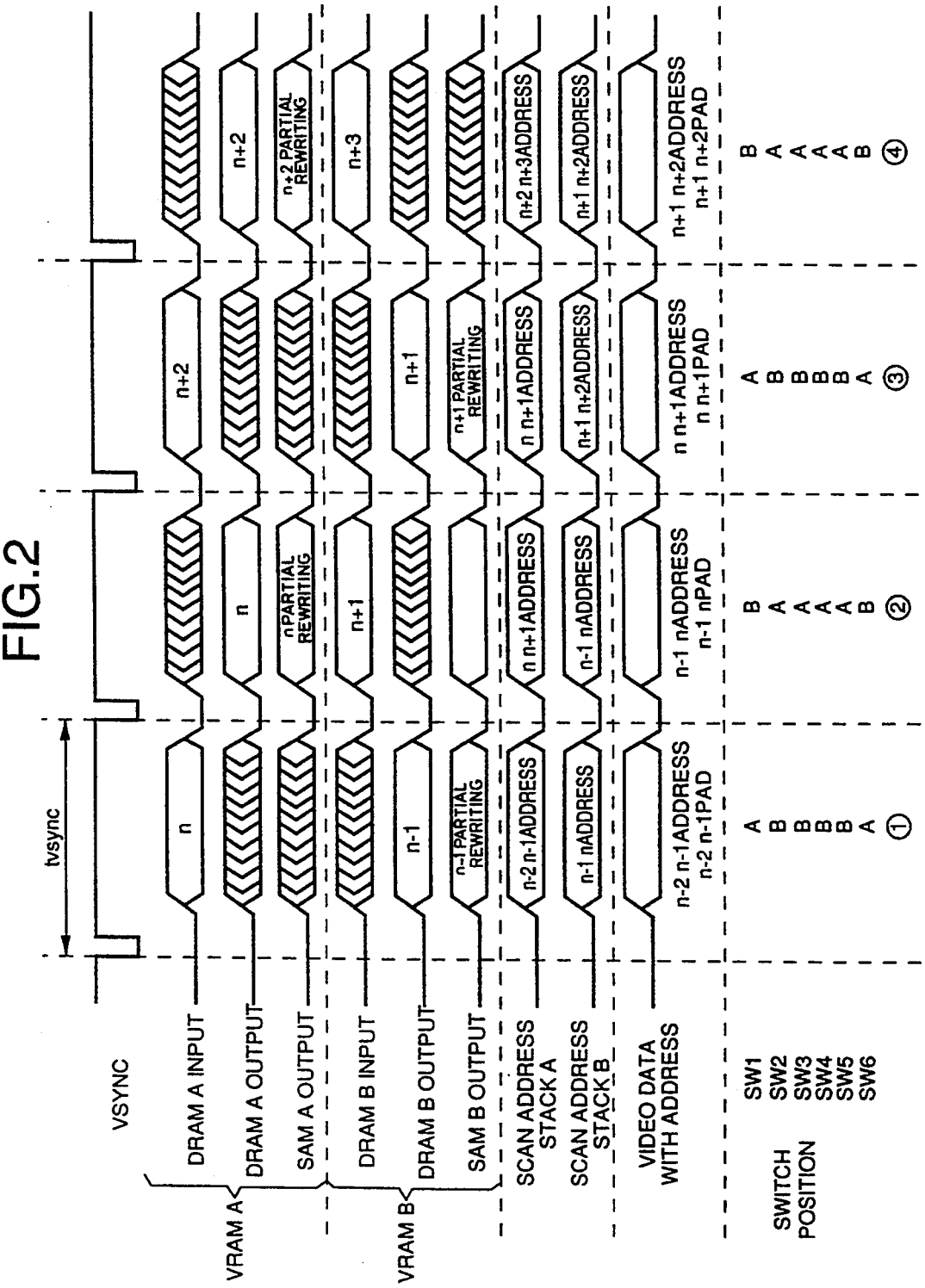

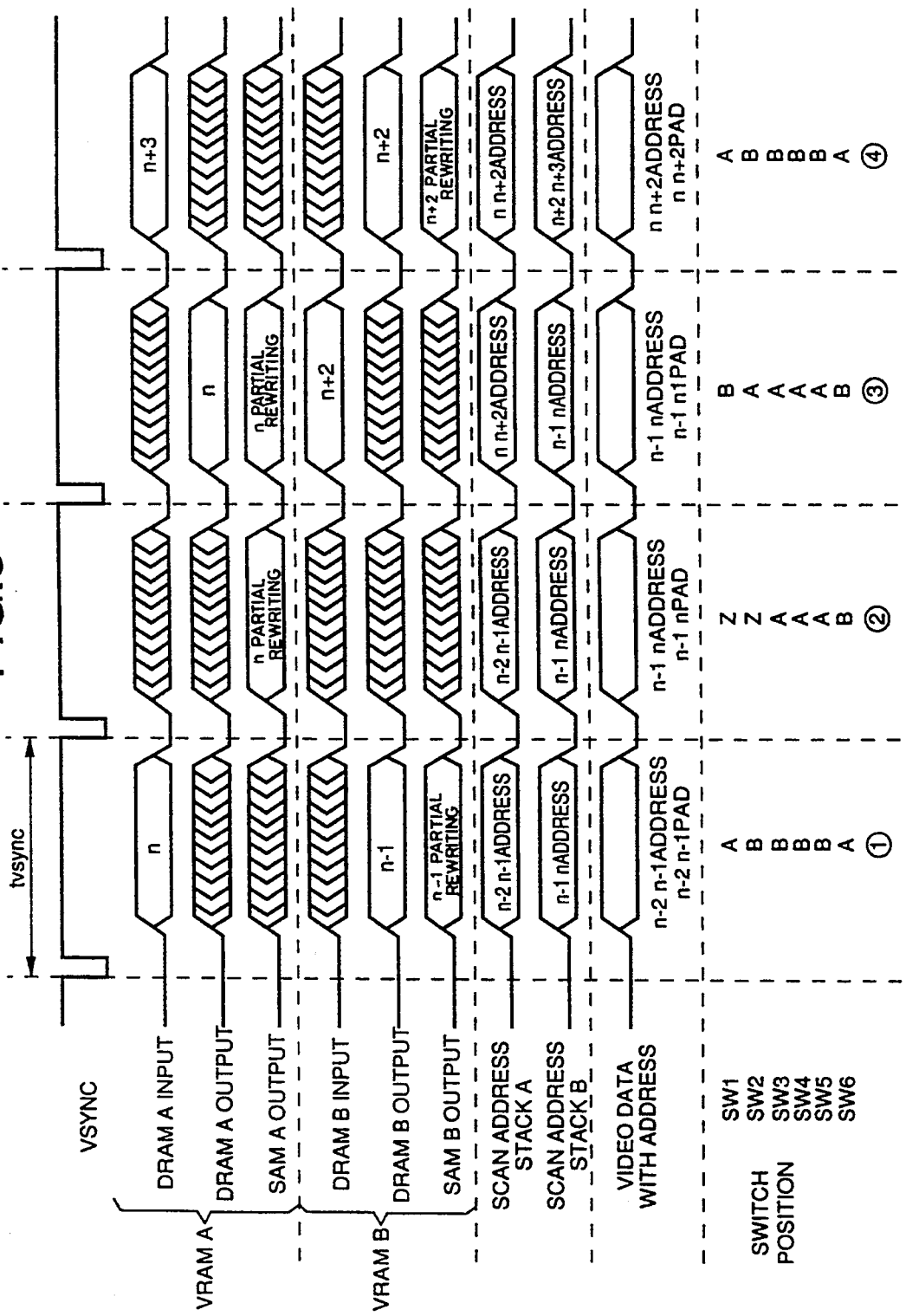

DISPLAY CONTROL APPARATUS FOR DISPERSIONLESS DISPLAY

BACKGROUND OF THE INVENTION

1. Field of the Invention

The present invention relates to a display control apparatus. More particularly, the invention relates to a dynamic image display control apparatus applicable to the dynamic image display of a ferroelectric liquid crystal display device.

2. Related Background Art

Traditionally, as a display device for a personal computer (hereinafter referred to as PC) or a work station (hereinafter referred to as WS), a CRT (Cathode Ray Tube) has been used. In recent years, however, a liquid crystal display device of TN (Twisted nematic) structure or STN (Super Twisted nematic) structure has been in use for a lap top PC and others because of its lightness and thinness which are advantageously brought about by its structure.

Also, it is required for the display device for the PC or WS to expand a window function or other graphic functions in order to enhance the visual comprehension based on the human-factors engineering. To implement this, a high resolution and a large screen are needed.

However, when increasing the number of scanning lines for a higher resolution, the liquid crystal display devices of TN, STN, and the like need a liquid crystal material having acutely sensitive electrooptic characteristics to secure a margin required for the display contrast. On the other hand, a ferroelectric liquid crystal having bistability enables images to be displayed on a large screen with a high resolution. However, ferroelectric liquid crystals hitherto known are not fast enough to execute a highly minute display due to its temperature characteristics when operational temperatures are low.

When the speed of the ferroelectric liquid crystal display is not high enough, there is known a method of image representation using a high order interlacing (hereinafter referred to as multi-interlace) to prevent flickering. This multi-interlace representation, however, causes so-called "dispersion" in displaying a pointing device, pop-up menu, scroll, and the like when a dynamic image should be displayed; thus degrading the quality of display after all.

For the prevention of the "dispersion" in display, there is known a method for partially rewriting images by non-interlacing for an object to be represented at high speeds. The image display control in this respect has hitherto been conducted using the video memory provided in the host computer. Such a display control apparatus is structured by adding a display control adapter 601 to a mother board 602 of a host computer 603 as shown in FIG. 6. As a result, "dispersion" in display on ferroelectric liquid crystal display device 600 is avoided. Alternatively, a display control adapter 611 can be added to an expansion slot 612 of host computer 613 to achieve the same effect on ferroelectric liquid crystal display device 610, as shown in FIG. 7.

SUMMARY OF THE INVENTION

In consideration of situations such as these, the present invention is designed, and an object of the present invention is to perform flickerless displays, using, without changing the structure of electrodes and others, the liquid crystal display device having an insufficient liquid crystal responding speed in highly minute displays and being dependent on non-interlace representations. More specifically, using a multi-interlace representation the flickers are prevented at the time of executing highly precise displays. It is still possible to generate dispersion for dynamic image displays in a high order interlacing. It is, therefore, necessary for the display control to partially rewrite an image using non-interlace for the objective representation which travels at high speeds. For the foregoing partial rewriting technique, there are several methods depending on the up-dating of image data on the multi-interlace or the selection of the objects which need the partial rewriting. Also, a display control apparatus according to the present invention is made mountable in a display device or between the host computer and the display device by giving design consideration to the structure of its video memory and partial rewriting control unit without any modification or addition of display functions on the host computer side.

In other words, it is another object of the present invention to provide a display control apparatus capable of performing highly precise and flickerless image displays without any dispersion on the basis of CRT image signals using a liquid crystal display.

In order to achieve the aforementioned object, according to the present invention, there is provided a display control apparatus comprising:

a frame memory for storing video data at least for one frame portion for CRT image signals;

storage means for comparing the video data stored in the aforementioned frame memory and the pixel data displayed at the same image position in the next frame for the video data to discriminate any changes in the contents of the display per pixel so that the address information of such a pixel showing any change is stored per pixel or per scanning line; and transferring means for reading the displaying pixel data from the aforementioned frame memory per pixel or per scanning line in accordance with the aforementioned address information to transfer such data to a display driving unit for driving the aforementioned liquid crystal display.

With the above-mentioned structure, representations are performed according to the present invention using multi-interlacing on a liquid crystal display device which generates flickering in conducting a highly precise noninterlace display. The dynamic image dispersion due to the multi-interlacing can be corrected by comparing the stored image data and the image data from the host computer so that a part which has been rewritten by the application of noninterlacing is represented using a partial rewriting method proposed by Kanbe et al in U.S. Pat. No. 4,655,561. However, it is necessary for the host computer to change or add display functions if hardware is used to implement the foregoing partial rewriting method.

According to the specific embodiments of the present invention, it is possible to provide a display control apparatus capable of solving the problems encountered in the following aspect:

(1) In a liquid crystal display device having matrix electrodes, at least one frame memory is provided as storage means for image signals separately from the video memory for a host computer in order to make a comparison with the displayed pixel data at the same image position in the next frame so that any changes in the content of display are discriminated per pixel, and storage means is arranged to store the address information of the changed pixels per pixel or per scanning line; thus reading the frame memory information in accordance with the foregoing address information for transfer.

(2) The period during which the changes in the displayed pixels are discriminated is set for each frame, and storage means is provided to hold the address information relative to time if the discrimination period is prolonged to cover two frames or more.

(3) The contents of the stored image indicated by the foregoing address information are read in asynchronism with the up-dating or image data per frame and are supplied to the liquid crystal display device to make it possible to conduct frame asynchronous type partial rewriting.

(4) In the display control apparatus shown in the foregoing (1), means can be arranged to switch over the input/output of the frame memory and the storage means for the address information by integral times the frame cycle.

(5) On the basis of the frame cycle information from the information supply source side as well as the information regarding the time required for the display device to conduct display, means for disabling the input/output of the foregoing frame memory is arranged to execute a synchronous type partial rewriting by prohibiting any comparison between pixels and video data input for the next frame until rewriting for one frame is completed.

(6) In the display control apparatus shown in the foregoing (1), means is arranged to recognize that the partial rewriting for at least one frame period is terminated at least in one frame cycle, and to output refresh video data until the input of the next pixel data.

(7) In the display control apparatus shown in the foregoing (1), there are arranged plural means for storing address information, means for selecting the storage location from a plurality of locations in accordance with the number of changed pixels for storage, and means for selecting the address information stored in a plurality of different locations in accordance with the number of changed pixels for reading on the basis of the frame cycle of the information supply source and the information regarding the time required for the display device to conduct display, and for executing the partial rewriting in accordance with the address information thus selected.

(8) There is arranged means for starting to transfer video information to the display driving device during the period where any transfer of the CRT video information to be supplied from the information supply source is suspended (Horizontal back porch period).

BRIEF DESCRIPTION THE DRAWINGS

FIGS. 1A and 1B are block diagrams showing an embodiment of a display control apparatus according to the present invention.

FIG. 2 is a timing chart for the partial rewriting operation in the apparatus shown in FIG. 1.

FIG. 3 is a timing chart for the synchronized partial rewriting operation in the apparatus shown in FIG. 1.

DETAILED DESCRIPTION OF THE PREFERRED EMBODIMENTS

Figure 4:
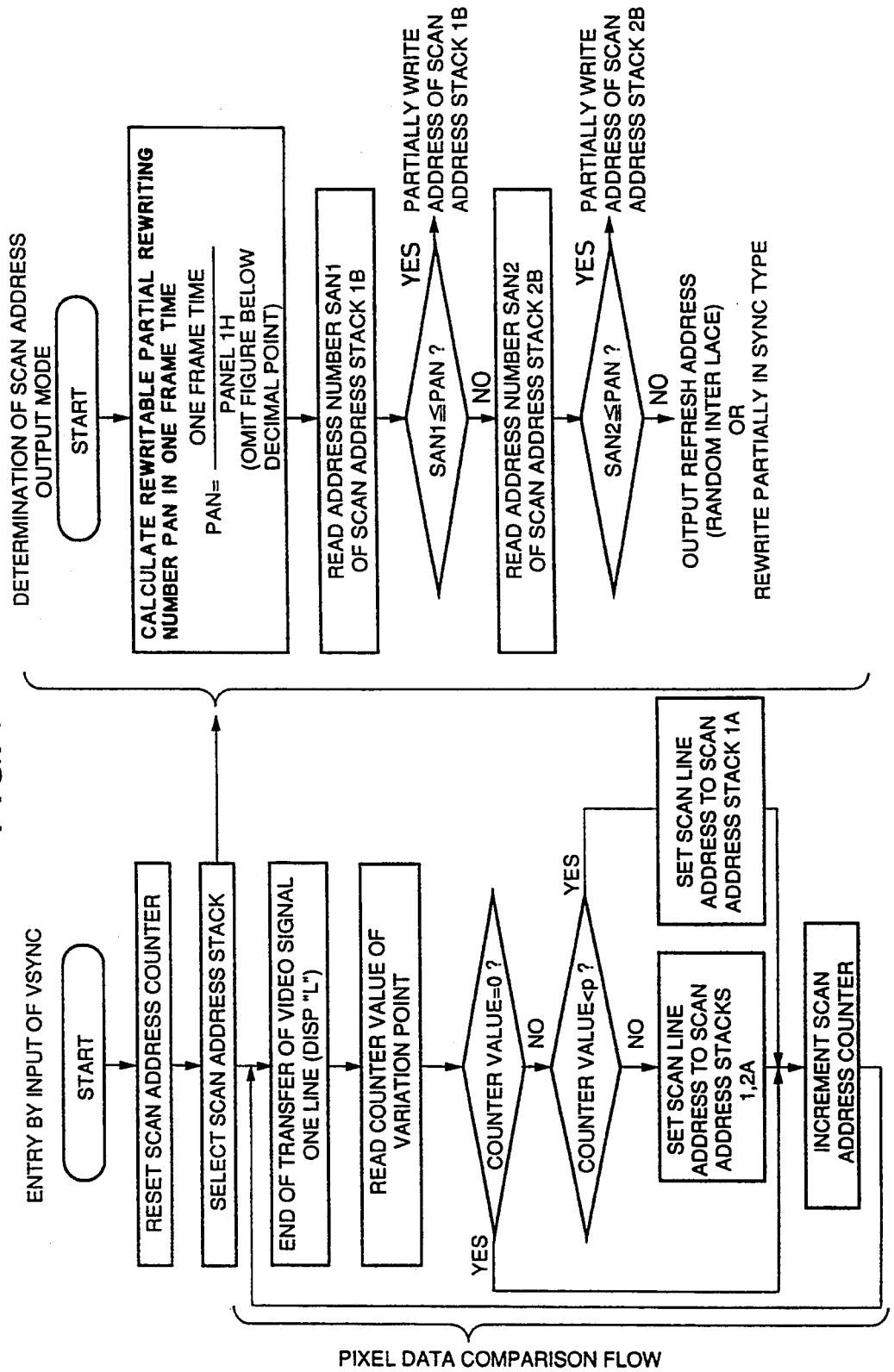
FIG. 4 is a flowchart showing the partial rewriting operation with limitations on changing pixel number in the apparatus shown in FIG. 1.

Hereinafter, in accordance with the embodiments, the present invention will be described in detail.

FIG. 1 is a diagram showing the circuitry of a ferroelectric liquid crystal driving device according to an embodiment of the present invention. In FIG. 1, a reference numeral 1 designates a ferroelectric liquid crystal display panel (FLC panel); 2, a common (scanning line) driver circuit for accessing arbitrary lines by specifying the scanning address; 3, a segmental (information lines) driver circuit; 4, a temperature sensor; 5, a drive IC controller for controlling the FLC panel to be driven with appropriate waveforms in accordance with the ambient temperatures; 6, a ferroelectric liquid crystal driving device (hereinafter referred to as FLCD) characterized by the present invention; 7, a first frame buffer (VRAM); 8, a second frame buffer (VRAM); 9, a first VRAM controller to control reading and writing for the first frame buffer 7; 10, a second VRAM controller to control reading and writing for the second frame buffer 8; 11, an image data comparator; 12, a control unit (CPU); 13, a first scan address stack; 14, a second scan address stack; 15, a scan address adding portion to add the scanning addresses to the image data; 16 to 21, control switches to be controlled by the control unit 12; and 22, a graphic card (CRTC) for the CRT image data supply source such as a personal computer and a work station.

Signal Names

Now, the description will be made of signal lines provided between the FLCD 6 and the graphic card 22 and driver IC controller 5 shown in FIG. 1 and the functions of each of the lines.

Signals between FLCD and Graphic Card (1) DISP (display enable signal): When the level of this signal is "H", image data are accepted by the video data line. When the level is "L", data are invalid.

(2) VSYNC (vertical synchronous signal): This is a synchronous signal for determining one frame timing. In a case of a usual CRT, this cycle is 1/70S or 1/60S.

(3) HSYNC (horizontally synchronous signal): This is a synchronous signal for determining one line timing.

(4) Video data (image data signal): The data written by a host CPU in the VRAM in the graphic card 22 are sequentially transferred per line in synchronism with the HSYNC.

(5) DOTCLK (dot clock signal): This is a timing signal for determining one dot timing for the video signal.

Signals between FLCD and Driver IC Controller (6) BUSY (image data request signal): This signal is outputted from the driver IC controller 5 to the FLCD 6. Each time this signal becomes "L", image data for one line portion are transferred to the driver IC controller 5.

(7) AH/DL: This is a signal to discriminate the image data transferred from the FLCD 6 and the scanning addresses. (This is required because the image data and scanning addresses are multiplexed on the FLC video data.) When the signal is "H", the scanning address data are transmitted as FLC video data. With the signal "L", they are video data.

(8) FLC video data: This is a bus for the video data and scanning address signal transferred from the FLCD 6 to the driver IC controller 5. The FLCD 6 transfers video data and scanning addresses for one line portion to the driver IC controller 5 in time-multiplex fashion each time a BUSY signal is received from the driver IC controller 5.

(9) Panel 1H information: This is a signal line for transferring time information regarding a 1H (the time required for rewriting one line) driven by the FLC panel 1 to the FLCD 6.

First Embodiment

Basic Operation

At first, the entire operation of the apparatus shown in FIG. 1 will be described in brief.

With the two frame buffers (VRAM) 7 and 8, the apparatus embodying the present invention accumulates per frame video data transferred from the graphic card 22 alternately in VRAMs 7 and 8. Then, the accumulated video data are compared with the video data at the same position in the next frame by means of the comparator 11 in order to store per line the line number including different pixels in the scan address stack 13 (or 14) through the CPU 12. Subsequently, during the next frame period (tvsync period), video data are read from the VRAM 7 (or 8) in accordance with the contents of the scan address stack 13 (or 14) and transferred to the driver IC controller 5 with the scanning addresses having been added thereto in the scan address adding portion 15. The driver IC controller 5 outputs the scan addresses and driving waveform control signals to a driver IC 2 on the scanning line side (scan line side driver IC) in accordance with the scanning addresses thus transferred as well as to transfer the video data per line to a driver IC 3 on the information line side (information line side driver IC). Then, at the same time, this controller outputs information line driving waveform control signals. For these driving waveform control signals, the driver IC controller 5 produces appropriate control signals in response to the value which the sensor 4 has provided by detecting the ambient temperatures of the FLC panel 1.

FIG. 2 is a timing chart for the partial rewriting method using the frame buffers according to the present invention. Hereinafter, the description will be made of the timing chart shown in FIG. 2. This timing chart is for a case where the number of lines PAN (for which partial rewriting should be conducted) having changed pixels in one frame can be represented within one frame period, that is, the following equation is satisfied:

$$tvsync \geqq PAN*1H$$

where the tvsync is a frame cycle and 1H is the time required for the FLC panel to rewrite one line.

Now, hereunder, the operational procedures for the FLCD 6 will be described. In this respect, procedural numbers and the numbers stated in the lower part of FIG. 2 are matched.

①  The video data in n−1th frame transferred from the graphic card 22 have been already stored in the VRAM 8, and it is assumed that each of the switches in FIG. 1 is set in the state (A or B) indicated by the switching positions in FIG. 2. At the same time that the video data in the nth frame to be transferred from the graphic card 22 are inputted into the VRAM 7, such data are compared by means of the comparator 11 per pixel with the video data in the n−1th frame outputted from the VRAM 8 while being in synchronism with the data in the nth frame. The CPU 12 stores the scan addresses of the lines where changes take place in pixels in the scan address stack 14 in accordance with the output from the comparator 11. The CPU 12 also reads from the scan address stack 13 the lines having the pixels which have changed between the frames of n−2 and n−1 and reads the video data corresponding to such a value from the VRAM 8. The data thus read will be transferred to the driver IC controller 5 by a BUSY signal request with the scanning addresses added (a partial rewriting for the n−1th frame).

②  During this period, all the switching positions are changed. The data in the n+1th frame are inputted into the VRAM 8. The data in the nth frame is outputted from the VRAM 7. Then, the comparator 11 compares the data in the nth frame and the data in the n+1th frame. The CPU 12 stores the scan line data having changed pixels in the scan address stack 13. At the same time, the CPU 12 reads from the VRAM 7 the partial rewritten data for the nth frame in accordance with the data in the scan address stack 14, and in synchronism with BUSY signals, transfers the data thus read to the driver IC controller 5 (a partial rewriting for the nth frame).

③  The switching positions during this period are the same as those in ①. The fetching operation for the data in the n+2th frame, partial rewriting, and others are sequentially executed in the same manner as in the above-mentioned procedures in ①. All the required determinations are made by the CPU 12.

④  The operations are executed in the same manner as ②.

Thereafter, the procedures from ① to ④ will be repeated.

Also, during each period, if the time is left over the 1H when the corresponding partial rewriting is terminated, that is, the following equation is satisfied, refreshing operation will be executed:

$$tvsync - PAN*1H \geqq 1H$$

The refreshing operation enables the CPU 12 to determine the scanning addresses to represent images by interlacing the FLC panel 1 at random (to prevent flickering) without any relation to the contents of the scan address stacks 13 and 14. Thus, the data are read from the VRAM in accordance with such addresses and transferred to the driver IC controller 5. At this juncture, the position of SW 6 becomes "R".

In this respect, when the tvsync < PAN * 1H, it is still possible to apply the above-mentioned basic operation. In such a case, the partial rewriting which cannot be executed during the tvsync period will be represented on the FLC panel at the time of refreshing operation.

Synchronous Type Partial Rewriting

Now, the description will be made of an example of a synchronous type partial rewriting whereby to cause the video data in the next frame to be disabled until the partial rewriting is completely over.

FIG. 3 is a timing chart. The following numbers of the operational procedures match the numbers stated in the lower part of FIG. 3.

① Both the switching positions and operations are the same as those in ① for the basic operations (FIG. 2).

② When the operation comes to this period, the CPU 12 reads the number of the scan addresses (PAN) stored in the scan address stack 14. Then, receiving from the driver IC controller 5 the 1H information of the FLC panel 1, the CPU calculates 1H * PAN. Thus, in accordance with the following equation, the CPU calculates the number of frames (Fn) required to complete all the partial rewriting for the contents in the scan address stack:

FN=1H * PAN/tvsync (discarding below the decimal point).

The example shown in FIG. 3 represents FN=2.

When the CPU 12 recognizes Fn=2, it determines that it is impossible to complete all the required rewriting during this period ② and switches over the switching positions of the SW1 and SW2 to "Z" to make the input of the next n+1 frame data disabled. Also, the CPU causes the output of the nth frame data of the VRAM 7 to be disabled so that the partial rewriting is possible only for the nth frame.

③ Knowing that the partial rewriting for the nth frame is terminated in this period ③, the CPU 12 switches over the switching positions of SW1 and SW2 to input the data for the n+2th frame into VRAM 8. Then, the data for the n+2th and nth frames are compared to store the scan addresses of the changed pixels in the scan address stack 13.

④ Thereafter, the operations are the same as the basic operations.

Partial Rewriting with the Controlled Number of Pixels Changed

FIG. 4 is a flowchart showing the execution of a partial rewriting with the controlled number of pixels changed. For this embodiment, there are provided a plurality of scan address stacks 13 and 14 (in the present embodiment, two stacks, respectively), and the stack is selected for storing the scan address data to be accumulated in accordance with the number of pixels changed. Then, when the relationship tvsync<1H * PAN, is satisfied the scanning lines for partial rewriting are controlled.

Now, FIG. 4 will be described in brief. The basic operations here are also the same as those described in the "Basic Operation". In this embodiment, two each of the scan address stacks (scan address stacks 1 (1A and 1B) and 2 (2A and 2B)) are provided, and by the number of pixels changed, the scan address stacks for storage are switched over.

The scan address stack 1 is a stack for storing the scan addresses if there is even one pixel which has been changed. The scan address stack 2 is a stack for storing the scan addresses only when the number of pixels changed is not less than a number P.

The CPU 12 calculates the number PA of the partially rewritable scanning lines within a period of frame cycle from the 1H information of the panel at the start of the frame (when VSYNC is inputted). Then, at first, the number of scan addresses PAN in the scan address stack 1 is read to be compared with the PA. If it is found to be not more than the PA, partial rewriting is executed in accordance with the contents of the scan address stack 1. If found to be more than the PA, the number of scan addresses in the scan address stack 2 is read to be compared with the PA. If found to be not more than the PA, partial rewriting is executed in accordance with the contents of the scan address stack 2. If more than the PA, a refreshing operation or synchronous type partial rewriting is executed. For the scan address stack, it may be possible to increase the threshold value to be more than 2 for a number of pixels changed. Also, it may be possible to change the P value in response to the 1H.

With the partial rewriting thus controlled by the number of pixels changed, it becomes possible to avoid a partial rewriting which should be executed for the entire area of a cross type cursor, for example. As a result, this is effectively applicable to the prevention of flickering.

Reading Method for VRAM Data

In FIG. 2, it is executed to read the DRAM and SAM of the VRAMs 7 and 8 asynchronously.

The SAM outputs are sequentially read in accordance with the BUSY signal requests from the driver IC controller 5. This cycle is dependent on the 1H of the FLC panel 1. On the other hand, the DRAM must be read in synchronism with the video data being transferred from the graphic card 22 in order to compare the video data. Therefore, if the 1H of the FLC panel 1 and the video data in the graphic card 22 are transferred asynchronously, the reading of the DRAM and the transfer from the DRAM to SAM become asynchronous; thus creating a problem that the addresses to be read are duplicated. In order to avoid this, it is necessary to delay the reading of the SAM data for the partial rewriting so that the transfer is executed from the DRAM to SAM during the period when the required video data are not transferred, that is, a horizontal back porch period, for example.

Figure 5:
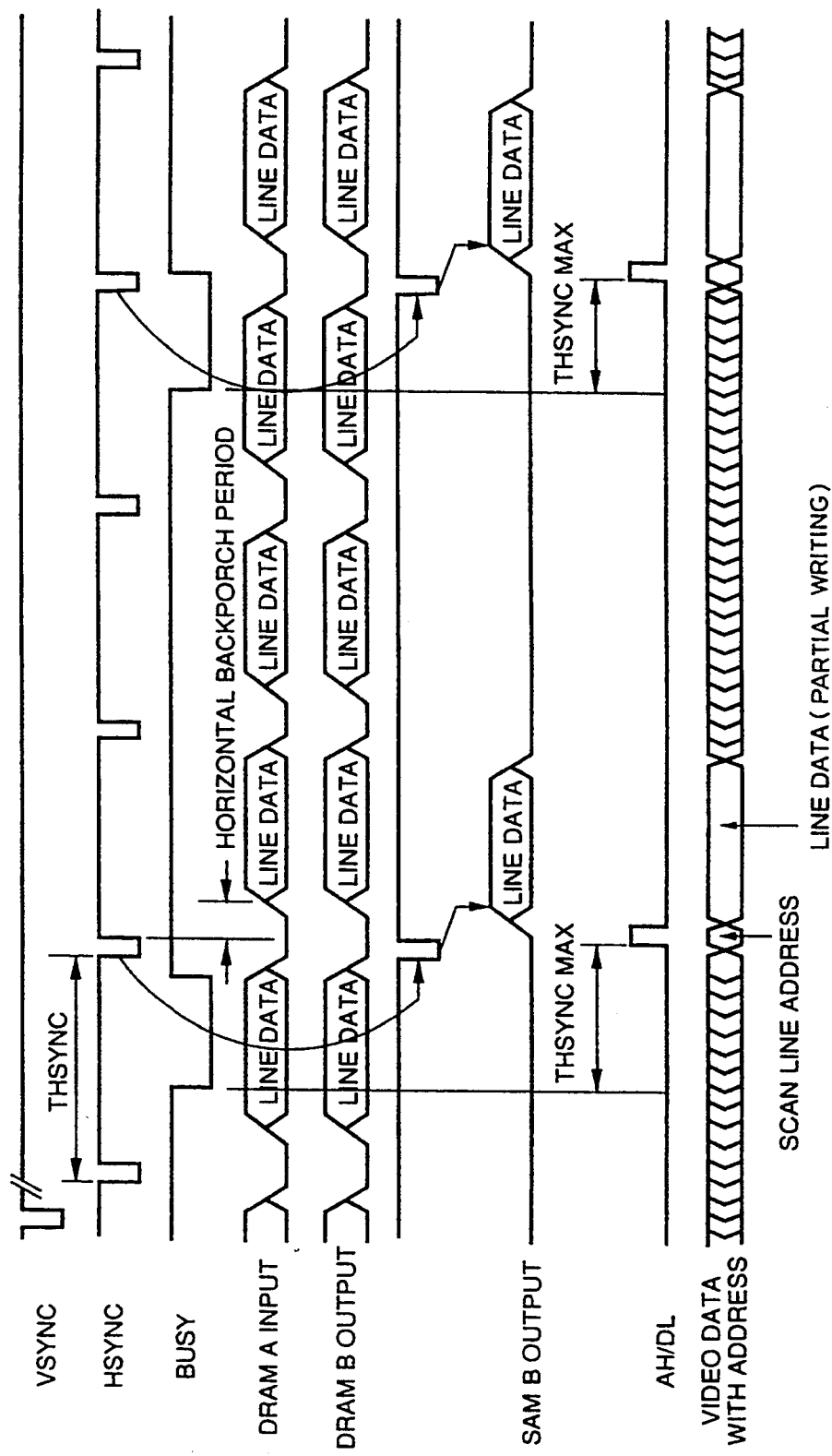
FIG. 5 is a timing chart for the VRAM data reading operation in the apparatus shown in FIG. 1.
Figure 6:
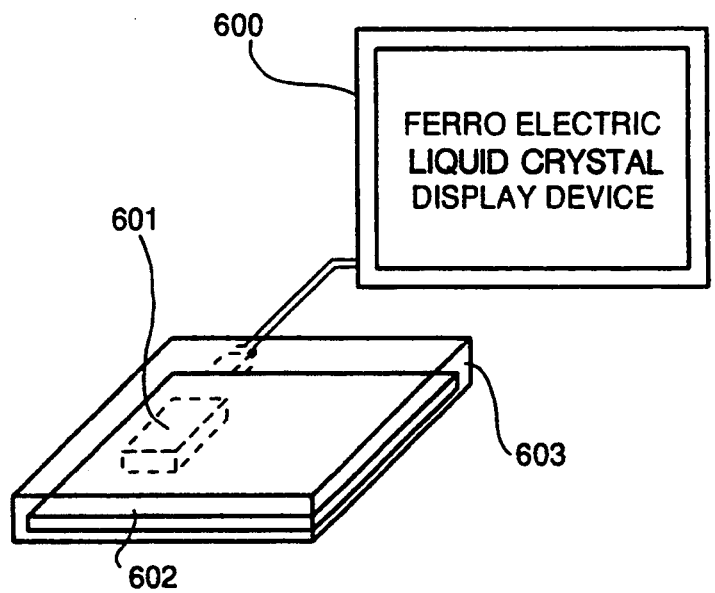
FIG. 6 and FIG. 7 are structural views showing the actual assembling states of the display control apparatus with a conventional personal computer.
Figure 7:
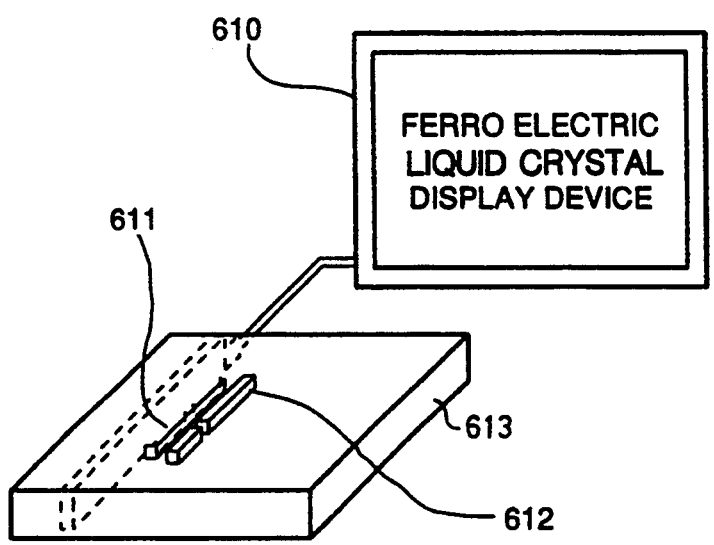

FIG. 5 is a timing chart for this reading method. When a BUSY signal is inputted while reading the video data in the DRAM, the transfer from the DRAM to SAM will be executed within a period (horizontal back porch period) from the input of the next HSYNC to the reception of the video data transferred. In this way, it is possible to avoid duplicating the read address for the DRAM.

In this respect, there is no problem even if the partial rewriting data are delayed because the 1H of the FLC panel is usually not less than two times the HSYNC cycle and by the time the 1H is over the video data will have been transferred.

Method for Rewriting One Frame Memory

In FIG. 1, when the SWs 1, 2, 3, and 4 are all fixed at "A", the display control apparatus will be of a one frame memory partial rewriting type. In this case, the data for which partial rewriting is attempted are updated by data in the next frame and transferred to the driver IC controller 5. Thus the updated data can be displayed. As the frame memory, only the VRAM 7 is used, and the number of the frame memories can be reduced; hence this method is cost effective.

As described above, according to the present invention, a flickerless display can be performed by multi-interlacing on the large screen of a liquid crystal display with a high precision using analogue CRT luminance signals or digital CRT luminance signals. It is also possible to adopt a partial rewriting method capable of performing display while preventing any dispersion in dynamic images at a position away from the location where the display function is provided for a host computer. Therefore, it becomes possible to incorporate this display control apparatus in a display device. Also, by setting an access address discrimination period having two or more frame periods, an objective representation can be held relative time so as to prevent any cross talk attributable to the accesses on one and the same scanning line; thus including a small area display in a large area display to enable more natural representation of images. Also, the frame asynchronous rewriting method is effectively employed when displaying dynamic images having rapid display changes. The frame synchronous rewriting method is effectively used when displaying dynamic images having slow display changes. With the control operations set forth above, it is possible to enhance the smoothness of display images.

What is claimed is:

1. A display control apparatus to enable a liquid crystal display device having matrix electrodes to conduct highly precise flickerless image display on the basis of CRT driving image signals, comprising:
   a frame memory for storing first frame video data on said image signals at least for one frame portion;
   storage means for comparing the first frame video data with displaying pixel data at a same image position in video data for a subsequent frame to discriminate any changes in display contents on a per pixel basis, and for storing address information of the changed pixels on a per pixel or per scanning line basis; and
   transfer means for reading displaying pixel data from said frame memory on a per pixel or per scanning line basis, based on said address information, and for transferring the data to a display driving unit of said liquid crystal display device.

2. The display control apparatus according to claim 1, further comprising means for determining a period of time necessary for said transfer means to read and transfer the displaying pixel data, wherein, when said period is two or more frames long, said storage means holds the stored address information for a time sufficient to complete reading and transferring of the displaying pixel data.

3. A display control apparatus according to claim 1, wherein
   the contents of stored images specified by said address information are read in asynchronism with the updating of video data per frame and supplied to said liquid crystal display device, thereby making a frame asynchronous rewriting possible.

4. The display control apparatus according to claim 1, further comprising means for switching the input and output of said frame memory and said storage means for address information by integral times the frame cycle.

5. The display control apparatus according to claim 1, further comprising means for disabling the input and output of said frame memory on the basis of frame cycle information transferred from a supply source of said image signals, and information regarding the time required for said display device to perform its display, thereby making possible a synchronous type partial rewriting which disables the input of and comparison with the displaying pixel data in the next frame until a partial rewriting for one frame portion is terminated.

6. The display control apparatus according to claim 1, further comprising means for discriminating termination of a partial rewriting operation at least within one frame period in at least one frame cycle to output refresh video data until the next pixel data are inputted.

7. The display control apparatus according to claim 1, wherein said apparatus further comprises:
   storing means having a plurality of said storage means for address information to store the locations to be stored by selecting storage means from its plural numbers in accordance with the number of pixels changed; and
   means for selecting and reading address information stored in a plurality of different locations in response to the number of pixels changed in accordance with the frame cycle at the supply source of said image signals, and information regarding the time required for said display device to conduct its display, thereby performing a partial rewriting in accordance with such address information.

8. The display control apparatus according to claim 1, further comprising means for starting to transfer video data to said display driving means in a horizontal back porch period during which no CRT video data on said image signals are transferred.

9. The display control apparatus according to claim 1, wherein said image signals are supplied from a personal computer or a work station of a host computer.

10. The display control apparatus according to claim 1, wherein said liquid crystal is a ferroelectric liquid crystal.

11. A display control apparatus capable of performing display control of a liquid crystal device having matrix electrodes on the basis of CRT driving image signals, comprising:
   a frame memory for storing first frame video data on image signals at least for one frame portion;
   storage means for comparing the first frame video data with displaying pixel data at the same image position in video data for the next frame to discriminate any changes in display contents on a per pixel basis, and for storing address information of the changed pixels on a per pixel or per scanning line basis; and
   transfer means for reading displaying pixel data from said frame memory on a per pixel or per scanning line basis, based on said address information, and for transferring the data to a display driving unit of said liquid crystal display device.

12. The display control apparatus according to claim 11, wherein said liquid crystal is a ferroelectric liquid crystal.

* * * * *

UNITED STATES PATENT AND TRADEMARK OFFICE
CERTIFICATE OF CORRECTION

PATENT NO. : 5,374,941
DATED : December 20, 1994
INVENTOR(S) : OSAMU YUKI ET AL.

It is certified that error appears in the above-indentified patent and that said Letters Patent is hereby corrected as shown below:

COLUMN 7

Line 43, "PAN, is" should read --PAN is--.
Line 44, "satisfied" should read --satisfied,--.

Signed and Sealed this

Twenty-third Day of May, 1995

Attest:

Attesting Officer

BRUCE LEHMAN
Commissioner of Patents and Trademarks